Patented Aug. 23, 1927.                                          1,639,664

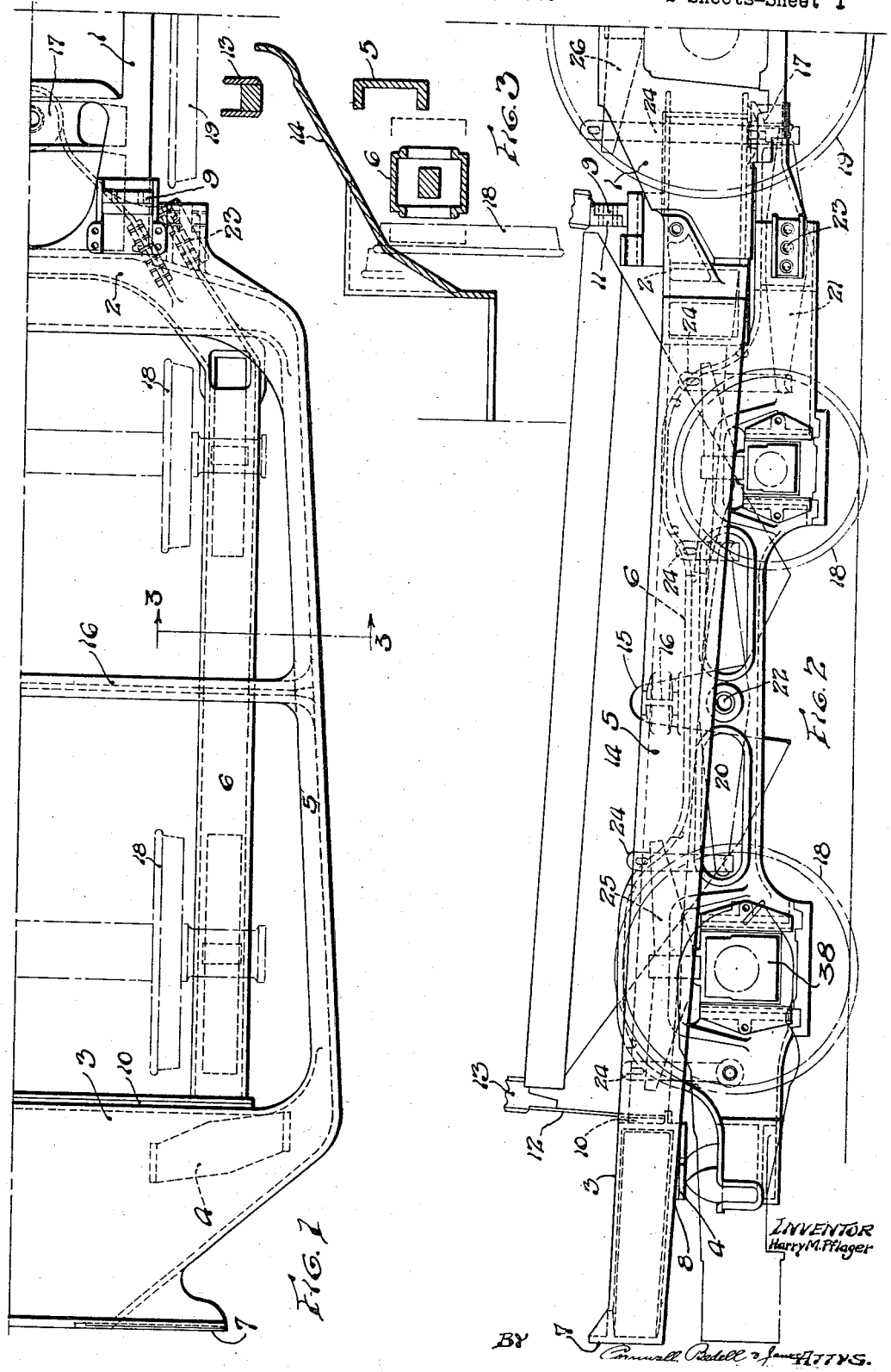

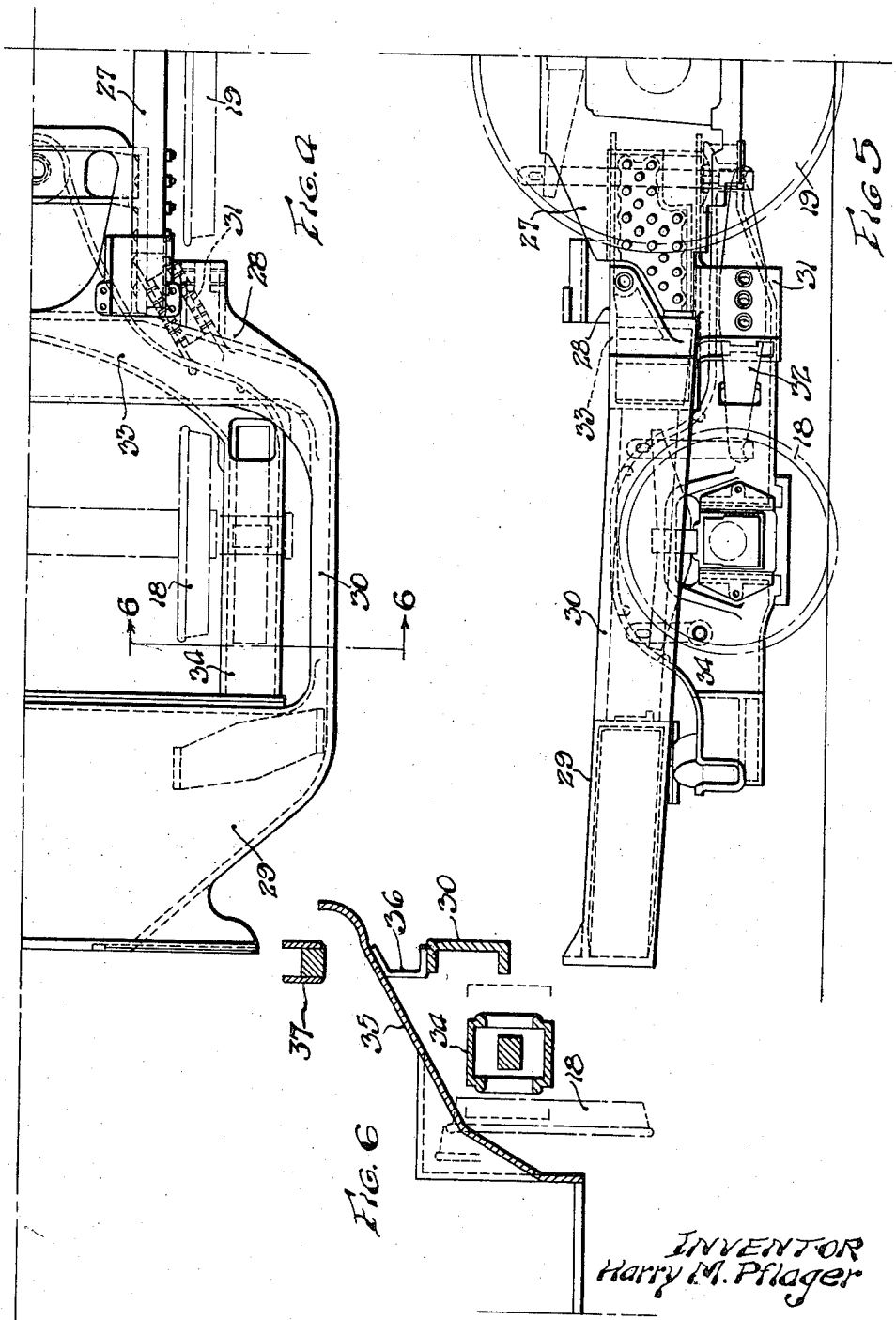

UNITED STATES PATENT OFFICE.

HARRY M. PFLAGER, OF ST. LOUIS, MISSOURI, ASSIGNOR TO COMMONWEALTH STEEL COMPANY, OF GRANITE CITY, ILLINOIS, A CORPORATION OF NEW JERSEY.

LOCOMOTIVE.

Application filed July 24, 1926. Serial No. 124,662.

My invention relates to railway rolling stock and consists in an improved locomotive structure. More specifically my invention relates to the rear end of the locomotive and involves the use of a novel cradle and its association with a radial trailer truck.

My present structure utilizes some of the features disclosed in Patent No. 1,371,579, issued to W. M. Sheehan, but comprises additional features not shown or suggested in this patent.

The main object of my invention is to provide a locomotive construction so arranged that the members comprising the cradle or rear portion of the frame extending under and supporting the firebox are widely spaced apart so as to provide a large ash pan space under an extra wide fire box and to transfer buffing and pulling shocks from the back end to the front end of the locomotive cradle.

Another object of my invention is to provide a cradle which is adapted to be used in association with a four wheel trailer truck, which type of trailer truck is now being provided for locomotives having the larger fire boxes referred to.

Another object of my invention is to provide a cradle which can be used in connection with a radial truck and in which the depth of the cradle will not be unduly restricted by the necessity of clearing the top of the truck frame substantially throughout the length of the latter, the securing of this object providing for the obtaining of another object, namely, the transmission of the draft and buffing stresses through the cradle in a line on a level with the main frame of the locomotive in front of the cradle.

Another object of my invention is to provide a cradle of the type described which is adapted to cooperate with a spring equalizing system whereby the truck and main equalizing systems are interconnected.

In the accompanying drawings which illustrate my invention—

Figure 1 is a half longitudinal top view of the rear end of a locomotive main frame, terminating in my improved cradle and showing the four wheel radial truck associated therewith.

Figure 2 is a side elevation of the parts shown in Figure 1.

Figure 3 is a vertical transverse section on line 3—3 of Figure 1.

Figure 4 is a half longitudinal top view corresponding to Figure 1 but illustrating a modified form of my invention in which the cradle is formed separately from the main frame and is attached thereto and is shown as adapted for and associated with a two wheel radial trailer truck and including a different spring equalizing arrangement.

Figure 5 is a side elevation of the parts shown in Figure 4.

Figure 6 is a vertical cross section taken on line 6—6 of Figure 4.

Preferably my cradle and main frame or bed are formed in a single casting, and in Figure 1 the side frame element 1 of the main frame is shown as being located within the locomotive wheels. A transverse bolster-like beam 2 forms the front end of the cradle and the rear end of side frame 1 and projects outside of the wheels. Another transverse bolster-like beam 3 forms the rear of the cradle and extends beyond the outside faces of the wheels to an even greater extent than member 2. The underside of member 3 is provided with side bearing elements 4 and also has an integral buffing plate 7 and drawbar pocket forming elements 8.

The outer ends of members 2 and 3 are connected by the side member 5 which is located wholly outside of the trailer truck frame 6, wheels 18, outside journal boxes 38 and springs 25. This arrangement enables me to increase the depth of the side members 5 as may be desirable to accommodate the stresses transmitted through these members, and I can also make the cradle side extend in a straight line between the beams 2 and 3. By referring to Figure 2 it will be seen that the cradle and portions of the truck frame overlap each other vertically, or, in other words, partly occupy the same general horizontal plane. The side member 5 is shown as diverging rearwardly from the longitudinal center line of the locomotive so as to provide clearance between the same and the truck frame when the locomotive is on a curve in the track.

The beam members 2 and 3 of the cradle are provided with brackets 9 and 10, respectively, for mounting the sliding plates 11 and expansion plates 12 on which the fire box is carried. A portion of the mud ring 13 is the only part of the fire box indicated but this and the other parts of the locomotive superstructure form no part of my present invention and are well known in the art. The ash pan 14 is carried by the fire box and extends downwardly over the trailer truck axles and is shown as being elevated at 15 in its middle portion so as to accommodate an intermediate cross member 16 connecting the cradle side members 5.

The weight of the cradle and its load is transmitted to the truck frame at the points 4 previously referred to and at a single central forward point 17 at which the trailer truck is pivoted to the main frame of the locomotive. This connection may take the form illustrated in Patent No. 1,559,488 issued to S. G. Wight. The load thus carried by the truck frame is distributed to the truck wheels 18 and the locomotive drivers 19 by any suitable equalizing system, here shown as comprising equalizers 20 and 21 fulcrumed on the truck frame at 22 and 23, respectively, and supported by suitable hangers 24 from the truck springs 25 and the driver springs 26.

In the modification illustrated in Figures 4, 5, and 6 the cradle is shown as a one-piece casting adapted to be attached to the rear end of the locomotive frame 27 by means of rivets or bolts and differs from my preferred structure in being much shorter, whereby it is adapted for a two wheel truck, and in having the ends of its front transverse beam 28 and its rear transverse beam 29 connected by side members 30 which are parallel with the center line of the locomotive. In this modification, the front beam 28 is provided with integral depending brackets 31 for fulcruming the equalizers 32, the front portions 33 of the trailer truck frames 34 extending inwardly and forwardly so as to clear brackets 31.

In Figure 6 I illustrate a modified form of support for the ash pan 35, the same being carried on the cradle side member 30 by suitable brackets 36 whereby the ash pan may be disconnected from the mud ring 37 and the latter relieved of the weight of the ash pan and the dump rigging, at the same time relieving the ash pan of the strains due to the expansion and contraction of the fire box.

These and other various modifications of the cradle may be made without eliminating the advantages of the wide cradle comprising beam sections connected by side members located outside of the trailer truck frame, and, where necessary, overlapping the same vertically.

I contemplate the exclusive use of these and all other modifications in the details of my invention as may be included in the spirit thereof as expressed in my claims.

I claim:

1. In a locomotive cradle, a forward load-supporting transverse beam member, a rear load-supporting transverse beam member, and longitudinal side members connecting the ends of said bolsters outside of the load supporting points and adapted to receive a trailer truck frame between them.

2. In a locomotive cradle, spaced transverse beams extending beyond the space required for outside journal boxes, longitudinal sides connecting the ends of said beams, and projections on said beams extending forwardly of the front beam and rearwardly of the rear beam for respectively transmitting longitudinal stresses to and from the locomotive main frame and tender.

3. In a locomotive cradle, a front transverse member adapted to support the locomotive superstructure at spaced points, a rear transverse member adapted to support the locomotive superstructure over the wheel tread, and longitudinal sides connecting the ends of said members, there being room between said members and sides for portions of a truck frame located substantially in the same horizontal plane as said sides.

4. In a locomotive cradle, a front transverse member adapted to support the locomotive superstructure at spaced points, a rear transverse member adapted to support the locomotive superstructure, and longitudinal sides connecting the ends of said members, there being room between said members and sides to permit transverse movement of a radial truck frame, portions of which are located in substantially the same horizontal plane as said cradle.

5. In a locomotive cradle, a front transverse member adapted to support the locomotive superstructure at spaced points, a rear transverse member adapted to support the locomotive superstructure, and longitudinal sides connecting the ends of said members, said sides diverging from each other rearwardly.

6. A one-piece casting including a locomotive main frame and cradle, the sides of said cradle being spaced apart a greater distance than the sides of said main frame.

7. A one-piece casting including a locomotive main frame, a transverse beam-like member at the rear end of said main frame, and cradle sides extending rearwardly from said member and spaced apart a greater distance than the sides of said main frame.

8. A one-piece casting including a locomotive main frame, a transverse beam-like member at the rear end of said main frame, cradle sides extending rearwardly from said member and spaced apart a greater distance than the sides of said main frame, and a second beam-like member connecting the rear ends of said sides.

9. A one-piece casting including a locomotive main frame, a transverse beam-like member at the rear end of said main frame, cradle sides extending rearwardly from said member and spaced apart at their forward ends a greater distance than the sides of said main frame and diverging rearwardly, and a second beam-like member connecting the rear ends of said sides.

10. A one-piece casting including a locomotive main frame, a transverse beam-like member at the rear end of said main frame, and cradle side members extending rearwardly from said beam and spaced apart a greater distance than the sides of said main frame and diverging rearwardly, and a second beam-like member connecting the rear ends of said side members.

11. In a locomotive, a trailer truck including a truck frame, and a locomotive cradle, the sides of which are located outside of the vertical planes of the sides of the truck frame.

12. In a locomotive, a trailer truck including a truck frame, and a locomotive cradle, the sides of which are located outside of the vertical planes of the sides of the truck frame, portions of said truck frame and cradle sides being located in substantially the same horizontal plane.

13. In a locomotive, a main frame, a trailer truck pivoted thereto and including a truck frame, and a cradle extending rearwardly from said main frame and having sides located outside of the sides of said truck frame and serving to transmit longitudinal stresses to and from said main frame.

14. In a locomotive, a main frame, a trailer truck pivoted thereto and including a truck frame, and a cradle formed integrally with said main frame and having sides located outside of said truck frame and merging with the sides of said main frame.

15. A locomotive cradle having longitudinal stress-transferring members adapted to accommodate between them load-carrying springs mounted on outside journal boxes.

16. A locomotive cradle comprising a one-piece casting with side pieces spaced apart and adapted to accommodate between them load-carrying springs mounted on outside journal boxes, and transverse members connecting the ends of said side pieces.

17. In a locomotive, a trailer axle with outside journal boxes and springs, and a cradle having longitudinal stress-transferring elements located outside of said boxes and springs.

18. In a locomotive, a trailer axle with outside journal boxes and springs, a cradle having longitudinal stress transferring elements located outside of said boxes and springs, and superstructure supporting portions inside of said elements.

19. In a locomotive, a trailer axle with outside journal boxes and springs, a cradle having longitudinal stress-transferring elements located outside of said boxes and springs, superstructure supporting portions inside of said elements, and transverse load-supporting beams spaced longitudinally of said elements.

In testimony whereof I hereunto affix my signature this 21st day of July 1926.

H. M. PFLAGER.